United States Patent
Weber

[11] Patent Number: 5,984,614
[45] Date of Patent: Nov. 16, 1999

[54] APPARATUS FOR RETRIEVING AND TRANSPORTING DISABLED VEHICLES

[76] Inventor: Randall W. Weber, P.O. Box 2056, Elkhart, Ind. 46515

[21] Appl. No.: 08/835,703

[22] Filed: Apr. 10, 1997

Related U.S. Application Data

[63] Continuation-in-part of application No. 08/632,340, Apr. 10, 1996, abandoned.

[51] Int. Cl.$^6$ ................................................ B60P 3/12
[52] U.S. Cl. ........................ 414/498; 414/546; 414/555; 414/547; 414/563; 280/402
[58] Field of Search ..................... 414/498, 546, 414/555, 547, 563, 500; 280/402

[56] References Cited

U.S. PATENT DOCUMENTS

| | | | |
|---|---|---|---|
| 4,318,657 | 3/1982 | Znidaric | 414/563 X |
| 4,679,978 | 7/1987 | Holmes et al. | 414/563 |
| 4,710,090 | 12/1987 | DeLuca et al. | 414/546 X |
| 4,750,856 | 6/1988 | Lapiolahti | 414/563 |
| 4,795,303 | 1/1989 | Bubik | 414/500 X |
| 4,840,534 | 6/1989 | Totty | 414/563 |
| 4,929,142 | 5/1990 | Nespor | 414/563 |
| 5,213,466 | 5/1993 | Bubik | 414/498 X |
| 5,244,339 | 9/1993 | Normand | 414/555 X |
| 5,352,083 | 10/1994 | Roberts et al. | 414/563 X |
| 5,607,279 | 3/1997 | Hill et al. | 414/563 X |

FOREIGN PATENT DOCUMENTS

| | | | |
|---|---|---|---|
| 849906 | 8/1970 | Canada | 414/547 |

*Primary Examiner*—Stephen T. Gordon
*Attorney, Agent, or Firm*—Baker & Daniels

[57] ABSTRACT

An improved towing vehicle for retrieving and/or transporting other vehicles such as vintage cars, disabled automobiles, or disabled trucks. The improved towing vehicle combines a rollback bed with a rear-mounted recovery boom that serves as both a conventional recovery boom and a wheel lift assembly. The improved wrecker truck of the present invention can thus transport two and possibly three vehicles at a time. The present invention also includes an improved rear-mounted multi-function recovery boom having a pivoting extension that greatly expands the towing vehicle's recovery and retrieval capabilities. Finally, the present invention includes a rollback bed that can be manipulated to a plurality of load positions, including a raised platform position in which the bed is raised to an elevated position over the towing vehicle.

9 Claims, 11 Drawing Sheets

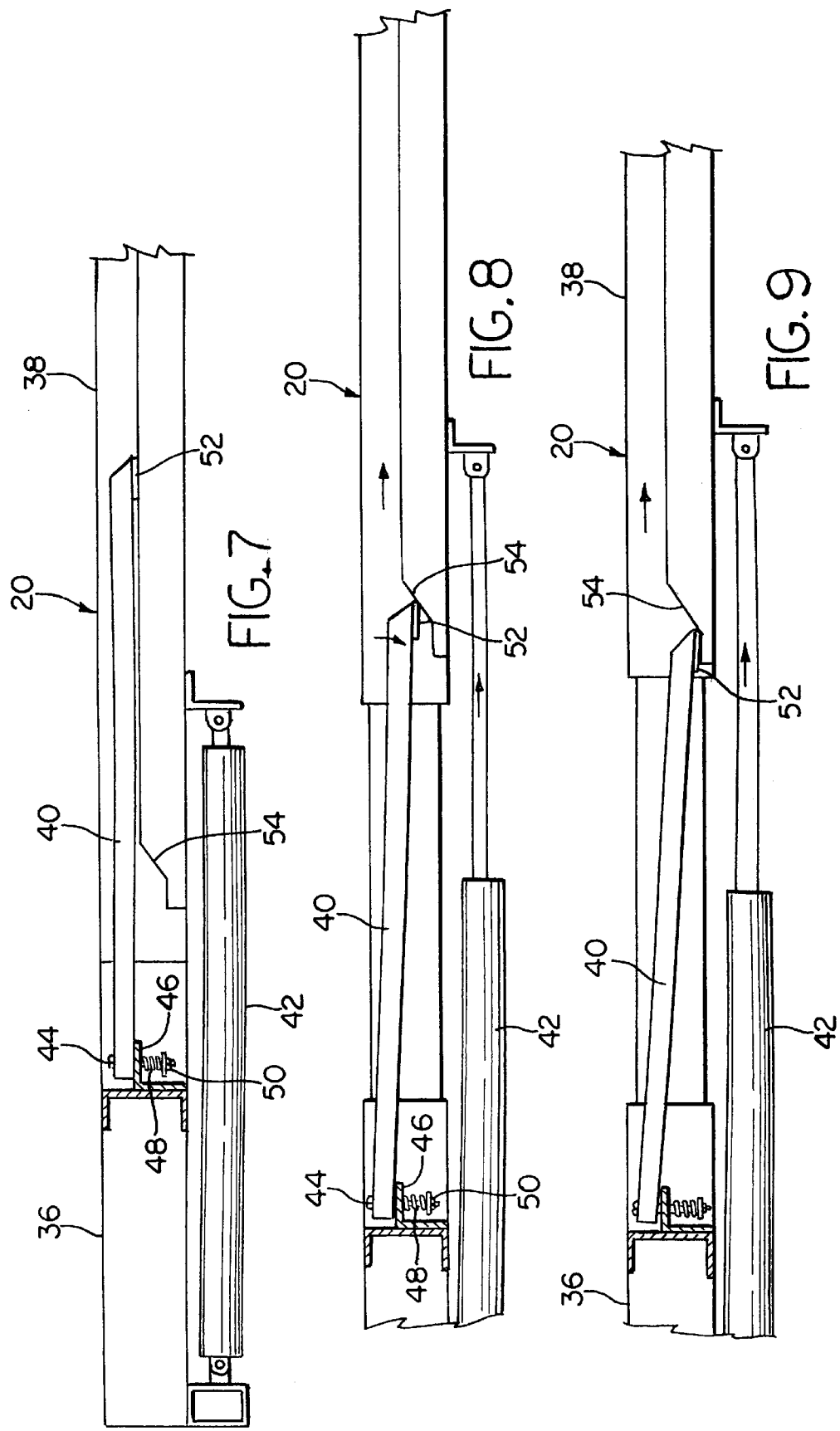

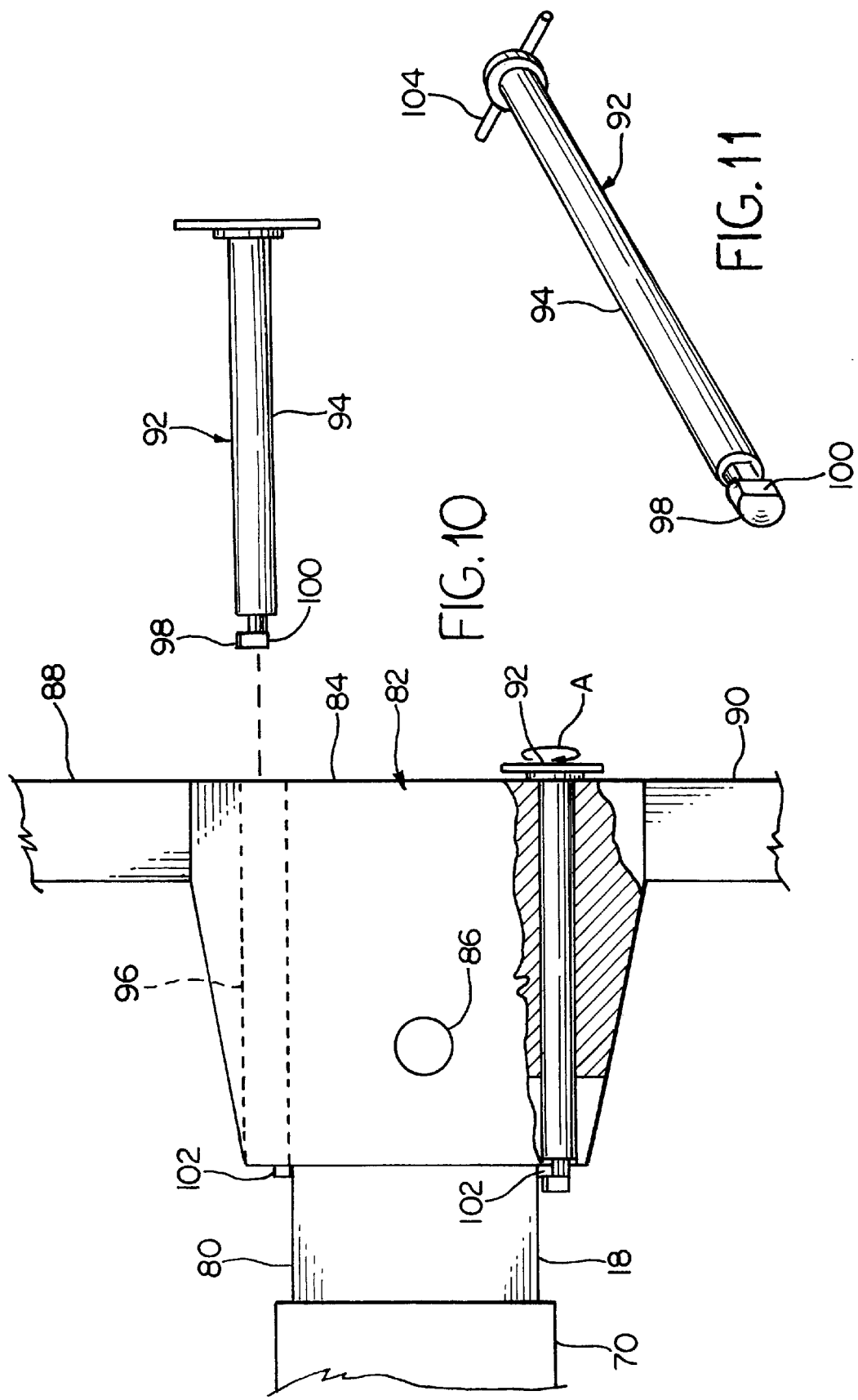

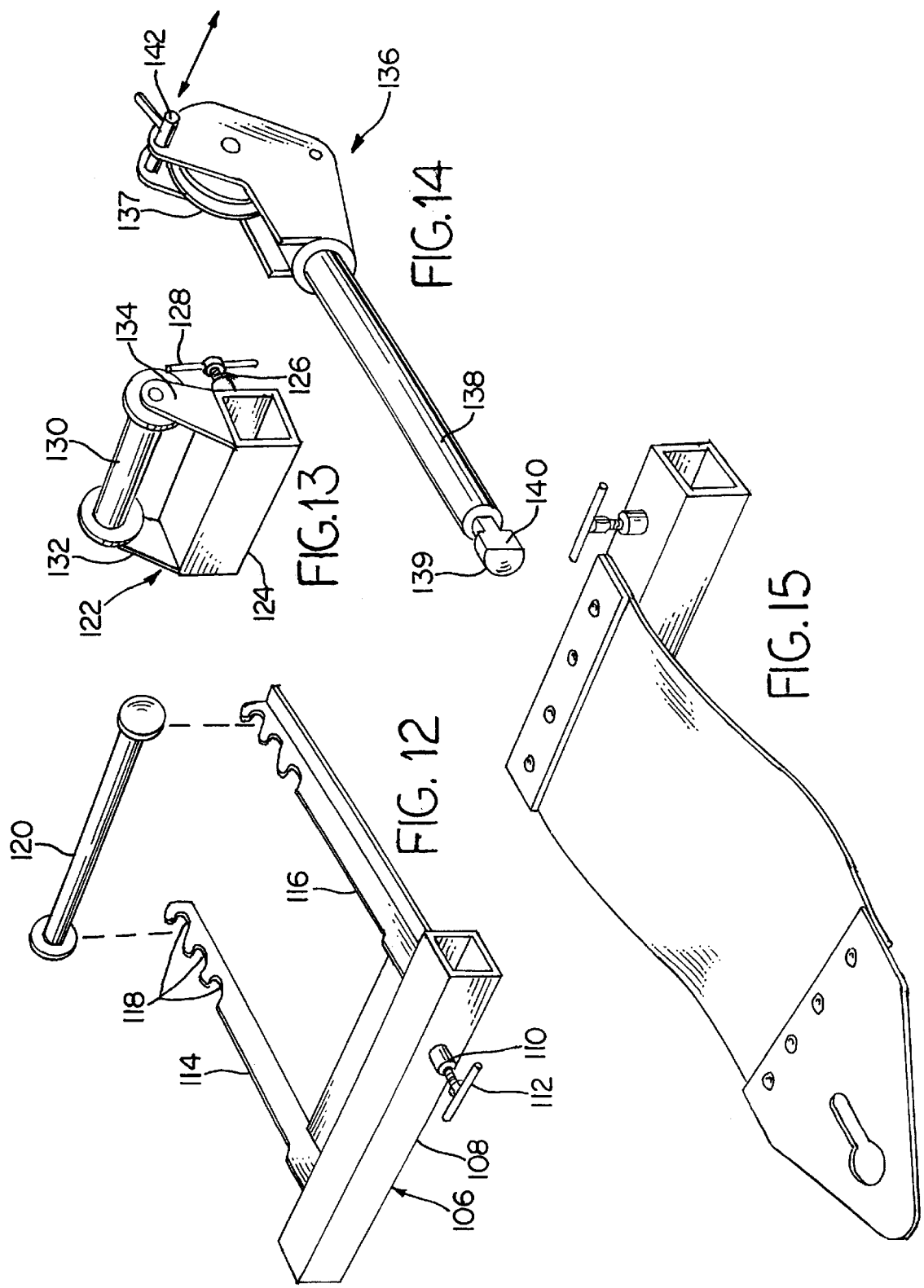

APPARATUS FOR RETRIEVING AND TRANSPORTING DISABLED VEHICLES

This application is a continuation-in-part of U.S. Ser. No. 08/632,340 filed Apr. 10, 1996 and now abandoned.

The present invention relates generally to a towing vehicle such as a tow truck or wrecker used for retrieving and/or transporting automobiles, trucks, and other vehicles. More specifically, the present invention relates to a towing vehicle having a rear mounted multi-function recovery boom that is shiftable between a raised position in which the boom operates as a standard recovery boom and a lowered position in which the boom operates as a wheel lift. The present invention also relates to an improved roll back bed that can be shifted to a raised platform position for recovering vehicles from or loading vehicles onto a tractor trailer truck, a railroad car or any other elevated surface. A tow truck or wrecker according to the present invention has greatly expanded vehicle recovery and retrieval capabilities, and can transport up to two vehicles at a time.

BACKGROUND AND SUMMARY OF THE INVENTION

Today's tow trucks and recovery vehicles come in a wide variety of designs for performing a wide variety of vehicle recovery and transport operations. These vehicles must be able to retrieve or recover disabled vehicles, ranging from cars, trucks, etc. that are simply inoperative and stranded on the roadside, to those that have flipped over or run off of the road into fields, ditches or ravines.

The simplest and most commonly recognized tow truck is probably the old "wrecker" design, which typically consists of a truck having a utility bed mounted behind the cab and a recovery boom having a cable and winch which is used to lift two wheels of a disabled vehicle off of the ground so that it can be towed to a repair shop. Many of these recovery booms now include a hydraulically operated telescoping section which extends and retracts. Such booms are more versatile than conventional recovery booms.

Another improvement to the basic wrecker design is the advent of "rollback" beds. A rollback bed is a flat transporting bed that tilts and/or moves in a rearward direction until the rear end of the bed is at or near the ground. A disabled vehicle is driven, rolled or winched onto the bed, the bed is returned to its original position and locked in place, and the disabled vehicle is then transported to a repair shop. Unfortunately, due to space considerations, a rollback bed precludes the use of a rear-mounted recovery boom and/or a rear-mounted wheel lift assembly. Thus, a towing vehicle equipped with a rollback bed has limited recovery capabilities.

Accordingly, there exists a need for an improved recovery and transport vehicle or wrecker that is capable of a wide variety of recovery and retrieval operations without sacrificing transport capabilities. Such an improved wrecker should be able to safely and effectively retrieve disabled vehicles from a wide variety of situations on and off the paved roads, and should be able to safely and effectively transport up to two vehicles at a time.

The improved wrecker truck of the present invention combines all of the functional advantages of a rollback bed, a rear-mounted wheel lift assembly and a rear-mounted multi-purpose recovery boom into a single towing vehicle. The wrecker truck of the present invention includes an improved rear-mounted multi-function recovery boom that is shiftable between a raised position and a lowered position. In the raised position, the boom performs all of the operations of a standard recovery boom. In the lowered position, the boom performs all of the operations of a conventional rear-mounted wheel lift assembly. The recovery boom also includes an extendable section which enhances the capabilities of the boom in both the wheel lift mode of operation as well as the recovery boom mode. Further, the recovery boom works in conjunction with the rollback bed to shift the rollback bed to a raised platform position. In the platform position the recovery vehicle can load or unload vehicles or even boats from semi-trailers, loading docks and other elevated surfaces.

The improved wrecker of the present invention also utilizes an improved tow bar assembly that can pivot when the boom is used as a wheel lift in which the truck is used to lift two wheels of a vehicle off of the ground for towing, and which further locks in place when the boom is used to guide the cables from either of two winches towards a disabled vehicle. The tow bar also serves as a platform to enable any of a variety of modular towing attachments to be removably secured to the tow bar/recovery boom assembly.

Accordingly, it is an object of this invention to provide a vehicle having a rear-mounted recovery boom and a rollback bed for retrieving and transporting other vehicles such as disabled trucks, automobiles, or vintage cars that Another object of this invention is to provide an improved wrecker truck that can transport up to two vehicles at a time.

A further object of this invention is to provide a wrecker truck having an improved rear-mounted multi-function recovery boom that also serves as a wheel lift.

These and other objects of the invention will become readily apparent to those skilled in the art upon a reading of the following description.

BRIEF DESCRIPTION OF THE DRAWINGS

FIG. 7 is a fragmentary cross-sectional view taken substantially along lines 7—7 of FIG. 6 showing the forward portion of the rollback bed in the shortened transport position;

FIG. 8 is a fragmentary side elevational view similar to that shown in FIG. 7 but showing the rollback bed being extended to the lengthened position;

FIG. 9 is a fragmentary side elevational view similar to that shown in FIGS. 7 and 8, but showing the rollback bed in the fully extended position;

FIG. 10 is an enlarged fragmentary view taken substantially at the circumscribed portion of FIG. 6 showing the pivoting portion of the tow bar assembly attached to the end of the recovery boom; one of the pair of locking pins is shown removed from the tow bar;

FIG. 11 is a perspective view of one of the locking pins shown in FIG. 10;

FIG. 12 is a perspective view of a modular wheel cradle for attachment to the tow bar;

FIG. 13 is a perspective view of a modular roller assembly for attachment to the tow bar for use when the rollback bed is to be placed in the platform position;

FIG. 14 is a perspective view of one of the removable pulley assemblies that can be attached to the recovery boom to guide either of the winch operated recovery cables;

FIG. 15 is a perspective view of a modular lifting sling for attachment to the tow bar;

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 1:
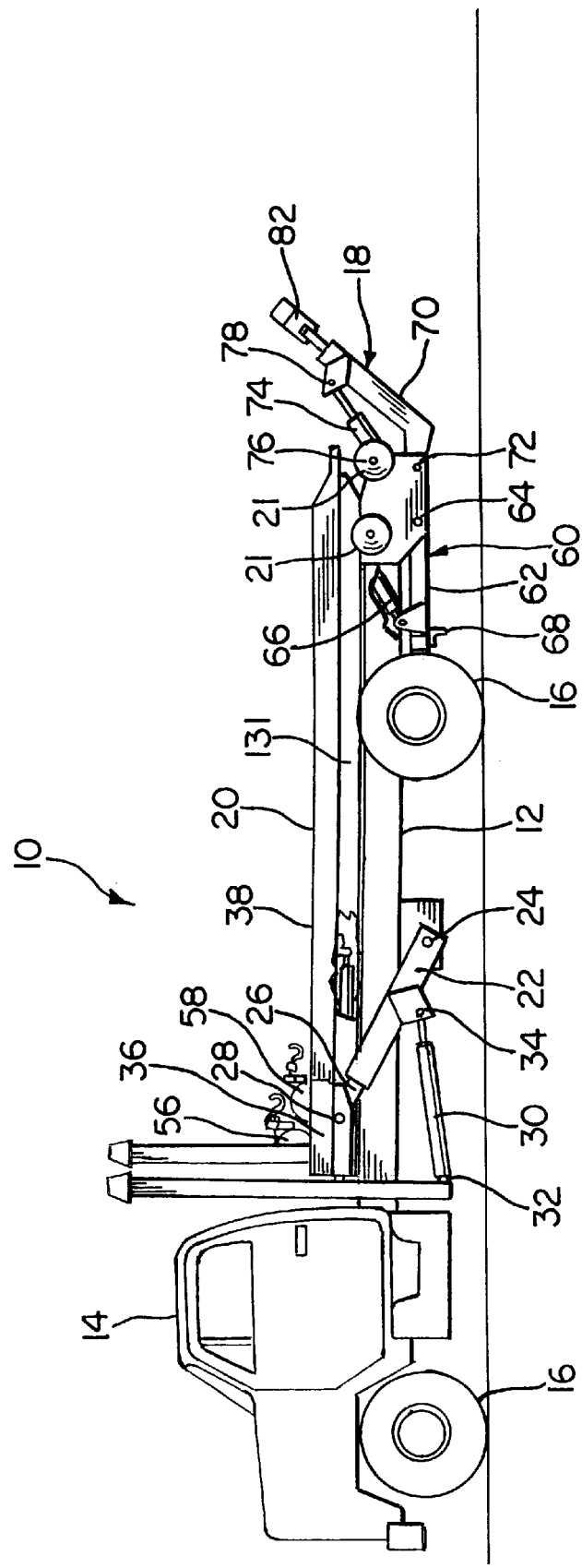
FIG. 1 is a side elevational view of the improved wrecker truck according to the present invention showing the rear-mounted multi-function boom in the raised position and the rollback bed in its shortened transport position; parts of the truck have been cut away to reveal the hydraulic pistons for operating the rollback bed and the stabilizing outrigger assembly.

Referring now to the drawings, FIG. 1 shows a wrecker truck of the present invention generally indicated by the reference numeral 10 for retrieving and transporting disabled automobiles, vintage automobiles, or similar vehicles. The wrecker 10 includes a frame 12 supporting a conventional cab 14, and includes at least two sets of wheels 16 for movement along a road. A multi-function recovery boom 18 is mounted to the rear portion of the frame 12, and a roll-back bed 20 is mounted to the frame 12 as is discussed in greater detail below.

Figure 2:
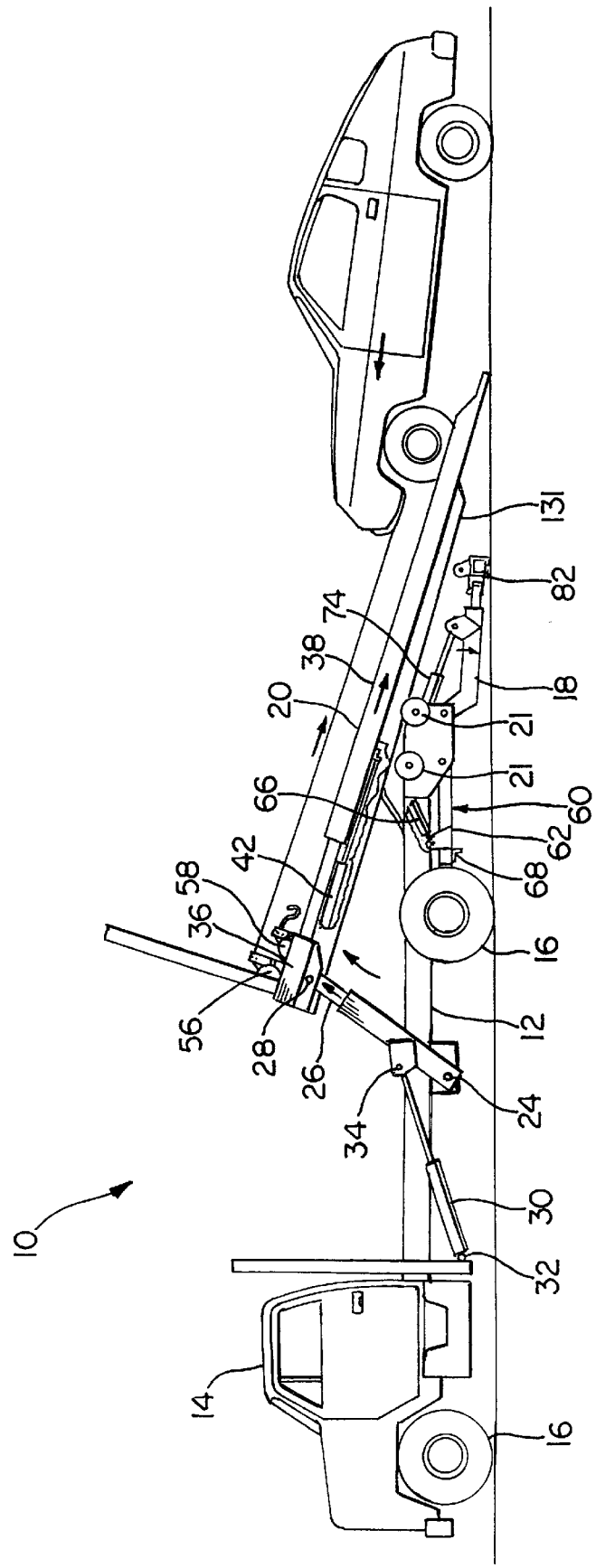
FIG. 2 is a side elevational view of the improved wrecker truck shown in FIG. 1 shown in the process of loading a disabled vehicle onto the rollback bed; the rear-mounted recovery boom is shown in the lowered position.

As shown in FIGS. 1 through 5, the roll-back bed 20 includes a pivot arm 22 which is mounted to frame 12 by a pivot 24. Pivot arm 22 includes a hydraulic cylinder 26 which is mounted to roll-back bed 20 by pivot 28. A second hydraulic cylinder 30 is connected to frame 12 by pivot 32, and is also connected to pivot arm 22 by pivot 34. Accordingly, roll-back bed 20 is shiftable between the transport position shown in FIG. 1 and the load position as shown in FIG. 2. A plurality of guide rollers 21 mounted to the rear of frame 12 serve to guide and support the rollback bed 20 as the rollback bed is shifted between positions.

As shown in FIGS. 1, 7, 8 and 9, roll-back bed 20 includes a forward portion 36, an extendable rearward portion 38, and a loading ramp 40. Roll-back bed 20 also includes a hydraulic cylinder 42 extending between the forward portion 36 and the rearward portion 38, and which is used to shift the roll-back bed between the shortened position shown in FIG. 7 and the extended position shown in FIG. 9. Ramp 40 is pivotally connected to forward portion 36 of roll-back bed 20 by a plurality of attachment bolts 44 through an angled mounting bracket 46. Each attachment bolt 44 includes a spring 48 and lock nut 50, which permits ramp 40 to shift between the generally horizontal position shown in FIG. 7 and the angled position shown in FIG. 9 when the roll-back bed is in the extended position. Ramp 40 also includes a nylon insert or liner 52 which engages an angled ramp 54 on rearward portion 38. Accordingly, forward portion 36, rearward portion 38, and ramp 40 cooperate to form a continuous loading surface regardless of the position of the roll-back bed 20.

As shown in FIG. 1, a pair of winches 56, 58 as are commonly employed in the industry are mounted to the forward portion 36 of roll-back bed 20.

Figure 4:
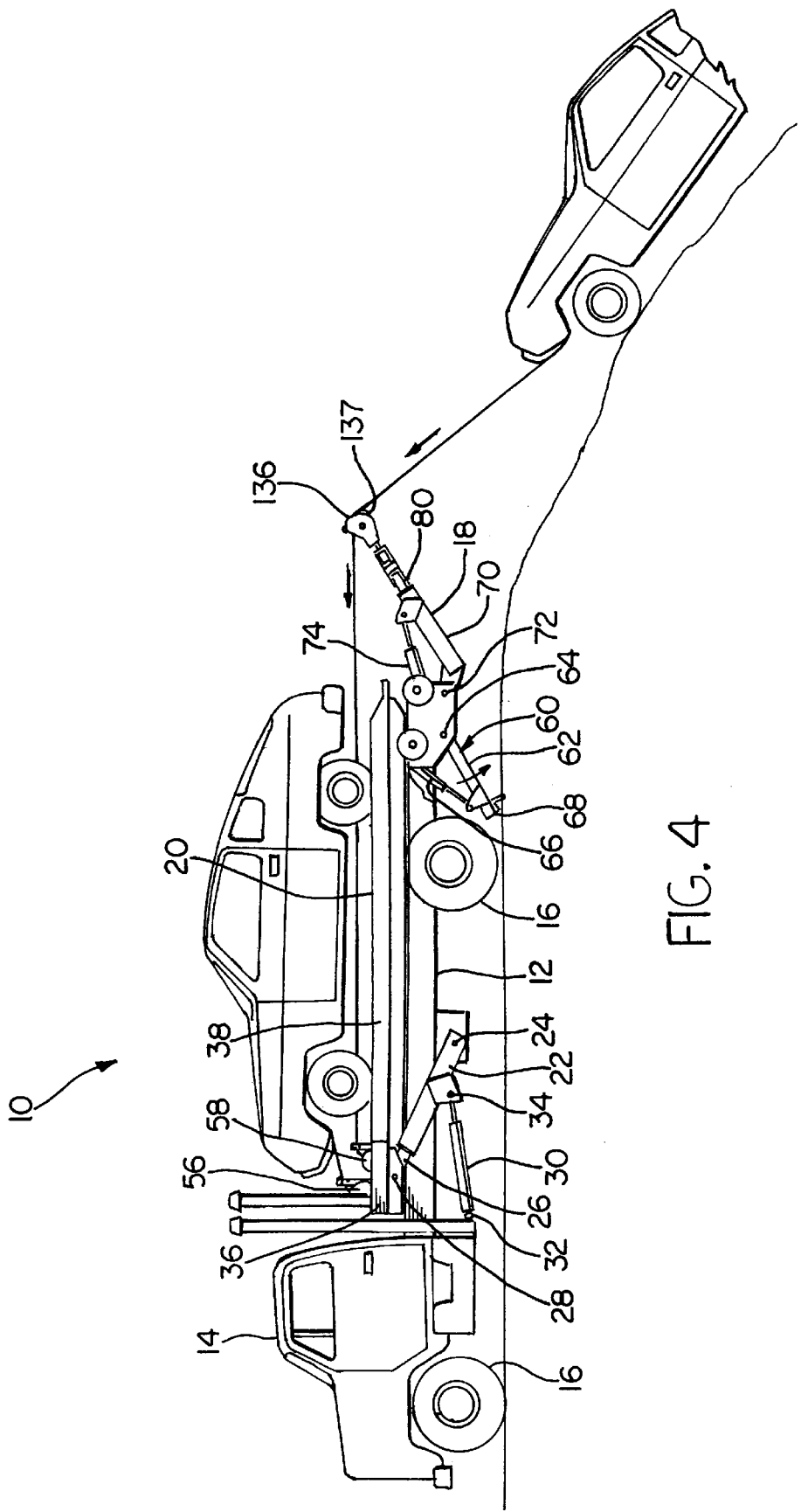
FIG. 4 is a side elevational view of the improved wrecker truck shown with a disabled vehicle secured to the rollback bed, and with the rear-mounted boom having a pulley attachment recovering a vehicle from a ravine using the second winch; the stabilizing outrigger assembly is shown in the lowered position to brace the truck.
Figure 5:
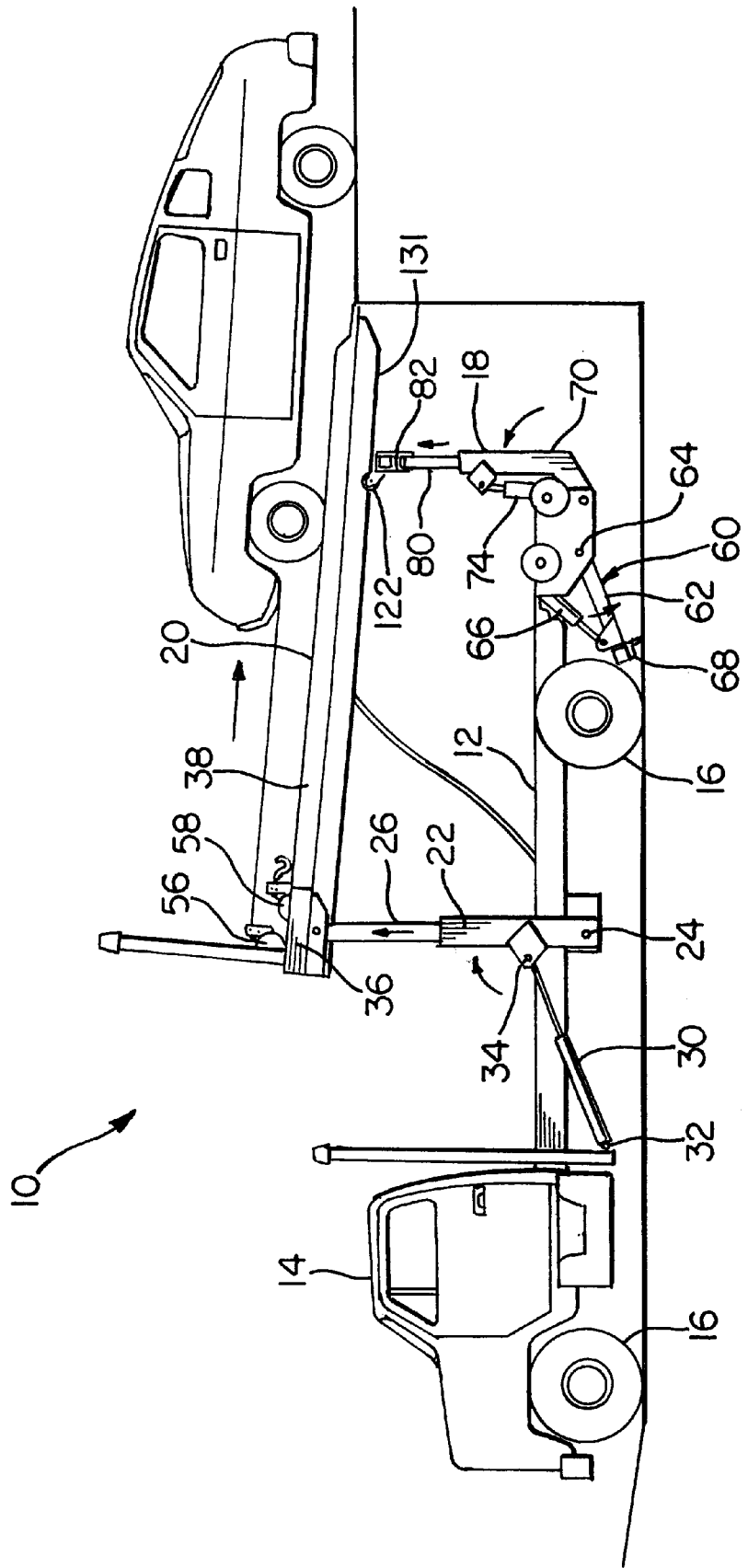
FIG. 5 is a side elevational view of the present wrecker truck shown with the rollback bed in a raised platform position.

Referring now to FIGS. 1, 4 and 5, a stabilizing outrigger 60 is attached to the rearward portion of frame 12. Outrigger 60 includes a member 62 which is attached to frame 12 by pivot 64. A hydraulic cylinder 66 connects the end 68 of member 62 to frame 12, and enables the outrigger 60 to be shifted between the retraced position shown in FIG. 1 and the stabilizing position shown in FIGS. 4 or 5 in which end 68 of arm 62 engages the ground. Outrigger 60 is used to stabilize the rearward portion of truck 10 when the truck is engaged in retrieval or recovery operations.

Figure 3:
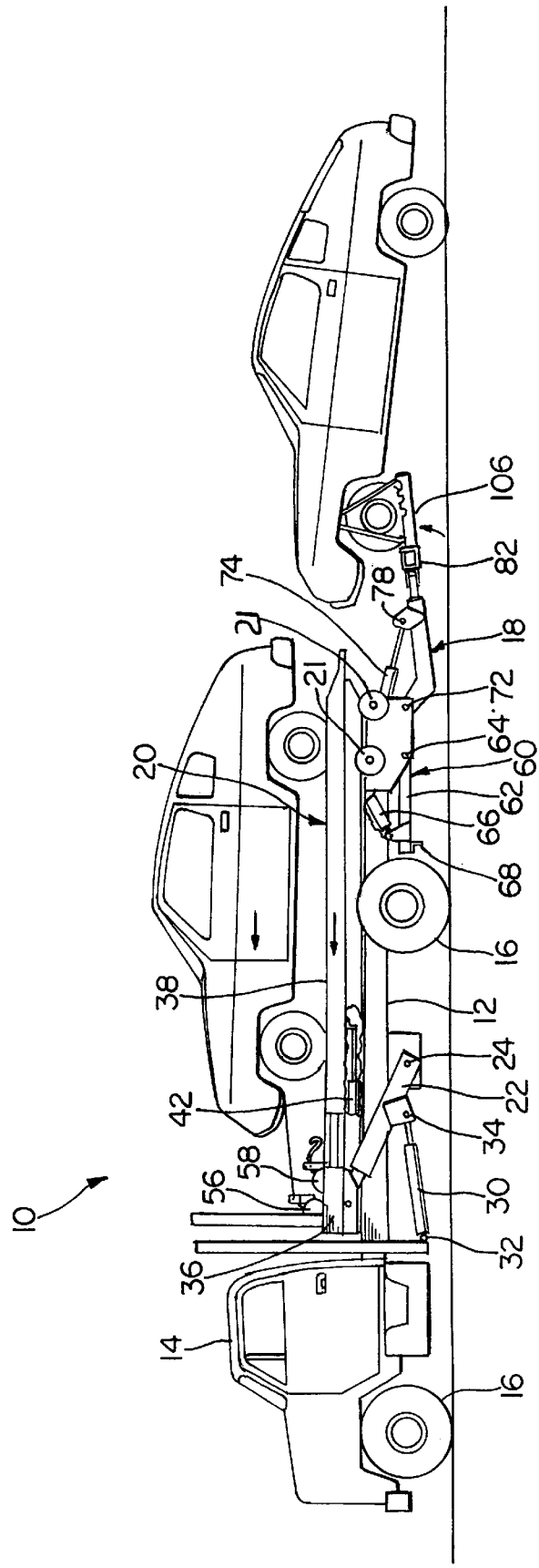
FIG. 3 is a side elevational view similar to that shown in FIG. 2, but with the rollback bed returned to its transport position and further showing the recovery boom in a lowered position and serving as a wheel lift.
Figure 16:
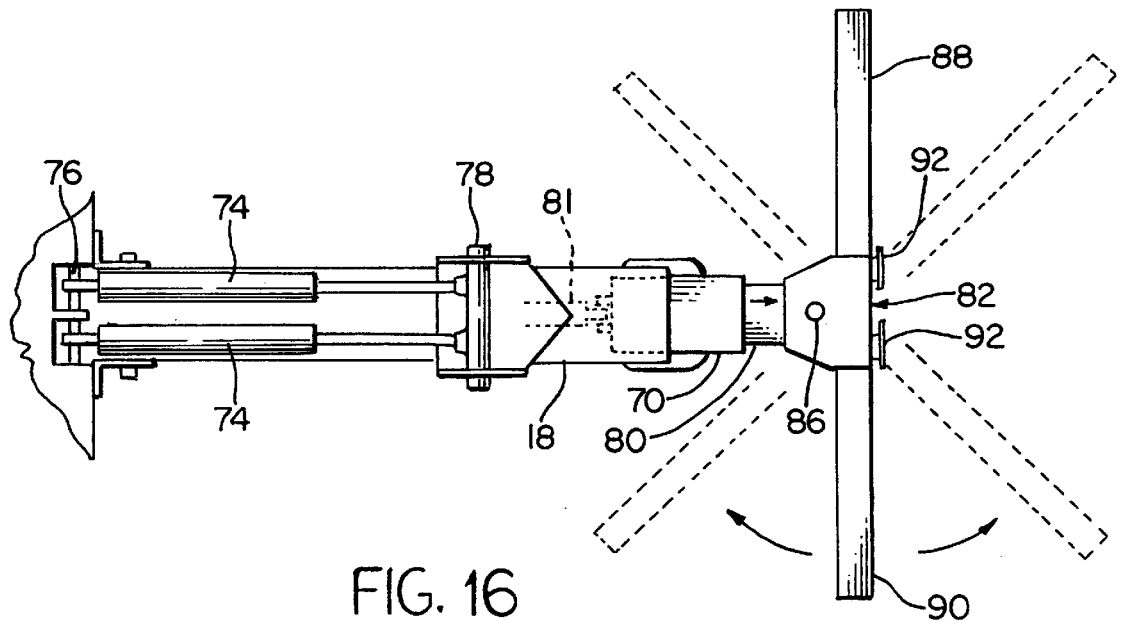
FIG. 16 is a top plan view of the recovery boom in the lowered position and showing the tow bar pivoting about the pivot point.
Figure 17:
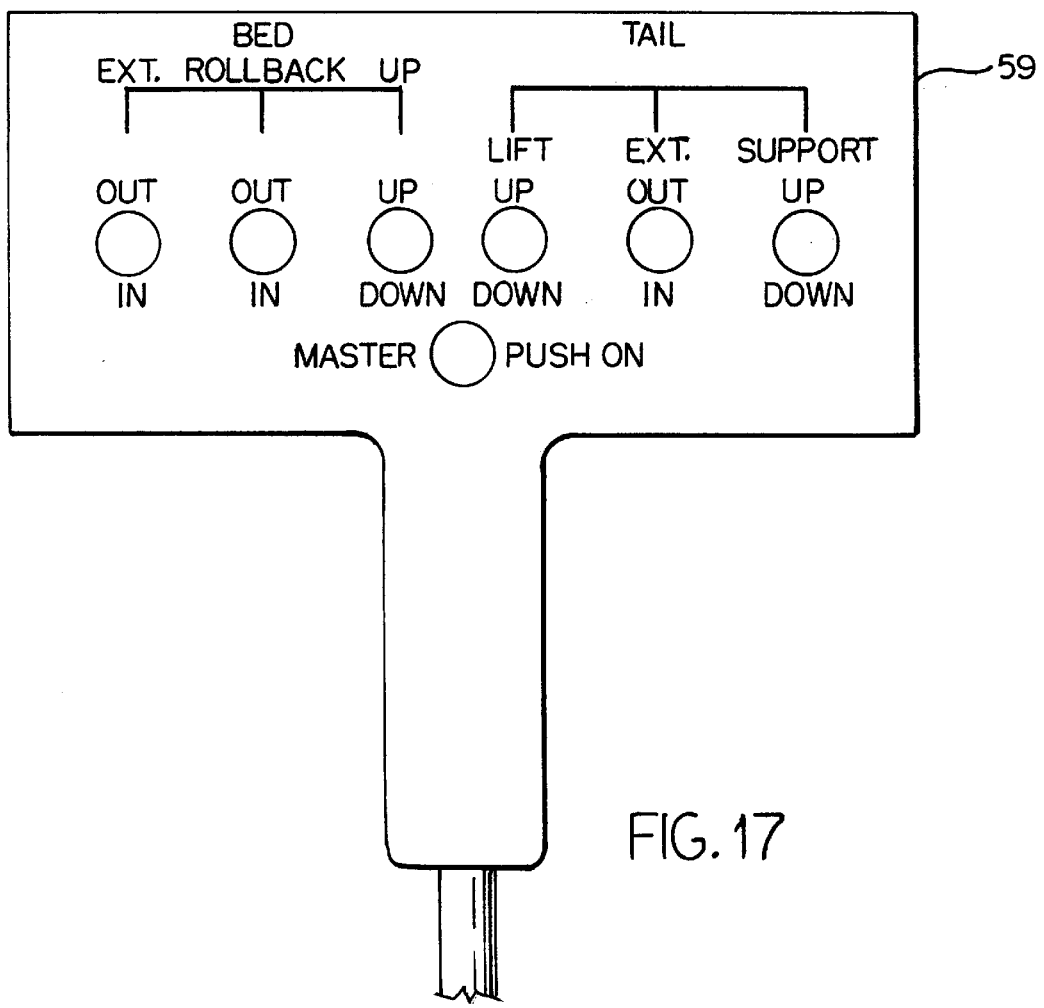
FIG. 17 is a side elevational view of the control panel for the present invention.
Figure 18:
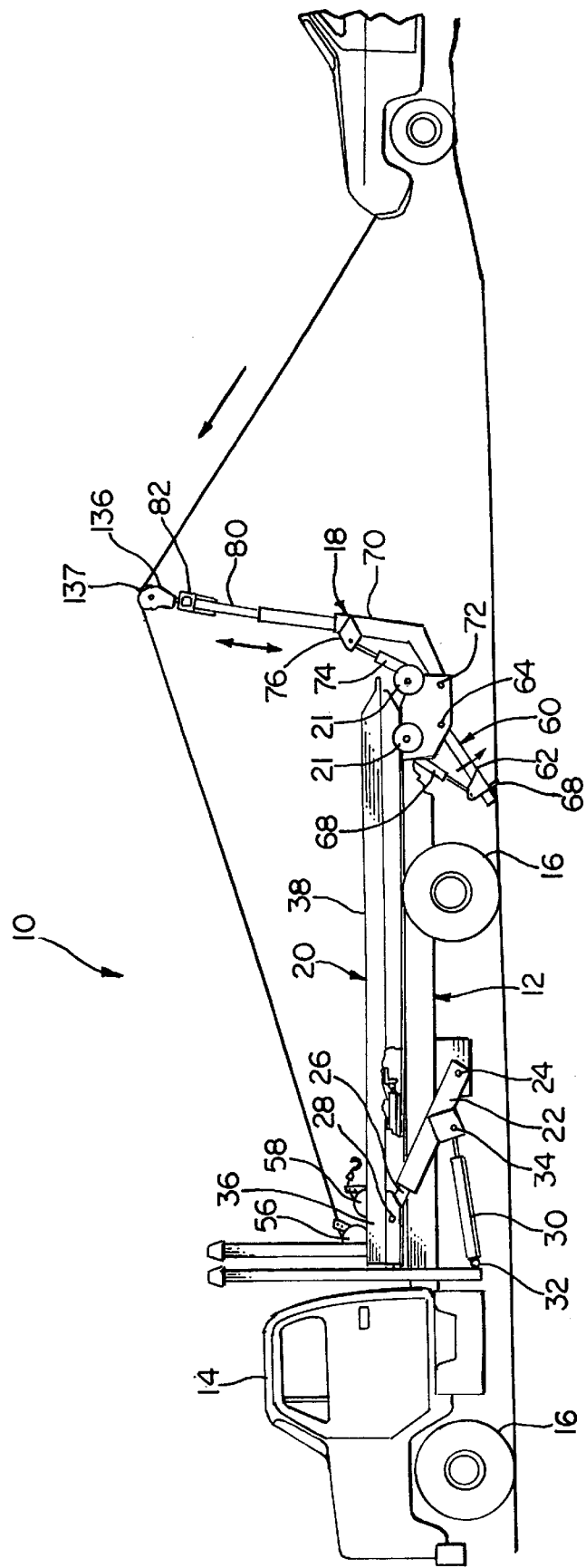
FIG. 18 is a side elevational view similar to that shown in FIG. 1 but shown with the rollback bed in the retracted position and with the recovery boom in the raised position being used to recover a disabled vehicle using one of the winches.

Referring now to FIGS. 1 through 5, multi-function recovery boom 18 includes a base member 70 which is mounted to frame 12 by pivot 72. A hydraulic cylinder 74 is connected to frame 12 by pivot 76 and to base member 70 by pivot 78. Hydraulic cylinder 74 thus permits recovery boom 18 to be shifted between the lowered position shown in FIG. 2 and the generally vertical raised position as shown in FIGS. 5 or 18. Recovery boom 18 also includes an extendable member 80 which is connected to the outer end of base member 70 and which is shiftable between the retracted position shown in FIG. 2 and the extended position shown in FIG. 5. As shown in FIG. 16, extending portion 80 is preferably operated by a hydraulic cylinder 81 as is common in the industry. Accordingly, using one or more of the auxiliary attachments shown in FIGS. 12 through 15, which are discussed in greater detail below, recovery boom 18 can be positioned as shown in FIGS. 4 or 18 for a variety of recovery operations. As shown in FIG. 18, the beam 18 can be moved to a position whish is generally vertical and which extends around the end of the retracted roll back bed 20. Alternatively, boom 18 can be positioned as shown in FIG. 3 for wheel lift operations, or in the raised position as shown in FIG. 5 to position the roll-back bed 20 in the platform position discussed above. As shown in FIG. 17, a single remote control board 59 is used to automatically synchronize and control each of the hydraulic cylinders at once, thus enabling the operator to load or unload rollback bed 20 or manipulate boom 18 in either of the available modes from an advantageous location.

Referring now to FIGS. 6, 10, 11 and 16, the outer end of member 80 includes a pivoting tow bar assembly. Tow bar assembly 82 includes a central portion 84 which is mounted to extendable member 80 by a pivot 86, and further includes a pair of outwardly extending arms 88, 90. As shown in FIGS. 10 and 11, a pair of locking pins 92 are used to lock the tow bar assembly 82 so that the outwardly extending arms 88, 90 are substantially perpendicular members 70 and 80 as shown in FIG. 16. Each locking pin includes a cylindrical center portion 94 which is inserted through a cylindrical aperture 96 in central portion 84. Each locking pin 92 includes a locking flange 98 having a truncated portion 100. The locking flange 98 engages a lock member 102 on member 80, thus preventing tow bar assembly 82 from pivoting about pivot point 86. The truncated portion 100 of locking flange 98 permits locking pin 92 to be inserted through aperture 96 past locking member 102, and then the locking flange 98 engages the locking member 102 upon rotation of locking pin 92 as indicated by reference arrow A in FIG. 10. Each locking pin 92 includes a handle 104 to permit rotation of locking pin 92.

FIGS. 12 through 15 show a variety of attachments for use with tow bar assembly 82. FIG. 12 shows a wheel-lift assembly 106 which includes a hollow tubular base member 108 which fits over either of outwardly extending arms 88, 90. A locking screw 110 having a handle 112 is provided to fix the position of wheel-lift 106 relative to its adjacent arm 88, 90. A pair of arms 114, 116 extend outwardly from base member 108 in a direction perpendicular to arms 88, 90, and each arm 114, 116 includes a plurality of cut-outs 118 for receiving a support bar 120 which extends between arms 114 and 116. Wheel-lift 106 is used when recovery boom 18 is used to support the front wheels of a disabled vehicle as shown in FIG. 3.

FIG. 13 shows a roller attachment 122 for placement over either of outwardly extending arms 88, 90. Roller attachment 122 includes a generally hollow base member 124 and a locking screw locking 126 having a handle 128 for fixing the position of roller attachment 122 relative to its adjacent arm. A roller 130 is pivotally attached to base 124 by a pair of upwardly extending flanges 132, 134. Roller attachment 122 is used when recovery boom 18 is in the position shown in FIG. 5 being used to manipulate the roll-back bed 20 into the platform position. Roller 130 engages and supports the lower frame rails 131 of roll-back bed 20.

FIG. 14 shows a locking pulley attachment 136 having a pulley 137 which replaces one or both of the locking pins 92 shown in FIGS. 10 and 11. In certain circumstances, such as that shown in FIGS. 4 and 6, the cables from either of winches 56 or 58 must be routed over the end of boom 18 towards a disabled vehicle. Each pulley attachment 136 includes a cylindrical center portion 138 which is inserted through the cylindrical aperture 96 in central portion 84. Each pulley attachment 136 includes a locking flange 139 having a truncated portion 140. The locking flange 139 engages the lock member 102 on member 80 in the same manner as the locking pin 92 discussed above, and thus preventing tow bar assembly 82 from pivoting about pivot point 86 when cables are routed over the pulley 137. Pulley attachment 136 further includes a removable pin 142, which enables a cable having a hook attached (not shown) to be routed over the pulley 137.

In operation, hydraulic cylinder 42 is used to extend and retract rollback bed 20 between the shortened position shown in FIG. 7 and the lengthened position shown in FIG. 2 or 9. Hydraulic cylinders 26 and 30 are used to move rollback bed 20 between the transport or travel position shown in FIGS. 1, 3 or 4 and the load position shown in FIG. 2. In order to position the rollback bed in the raised platform position shown in FIG. 5, the operator starts by raising the forward end of rollback bed 20 using hydraulic cylinders 26 and 30. The operator then moves recovery boom towards the upright position shown in FIG. 5. In the process, the roller attachments 122 which have been secured to the outwardly extending arms 88, 90 of tow bar assembly 82 engage the lower frame rails 131 of rollback bed 20, so that the rails 131 roll over the roller 130 as the boom 18 approaches the vertical position. Once in a generally horizontal position, rollback bed 20 can be raised and lowered by operating cylinders 26 and 81.

FIG. 3 illustrates the operation of boom 18 when used as a wheel lift. Using hydraulic cylinder 74, the boom 18 is lowered towards the position shown in FIG. 3. The operator then extends extendible member 80 until the outward end of boom 18 is under the disabled vehicle. Using either the wheel lift attachments or the sling attachments shown in FIGS. 12 and 15, respectively, the boom can then be used to lift the front wheels of the disabled vehicle off the ground by retracting cylinder 74.

Figure 6:
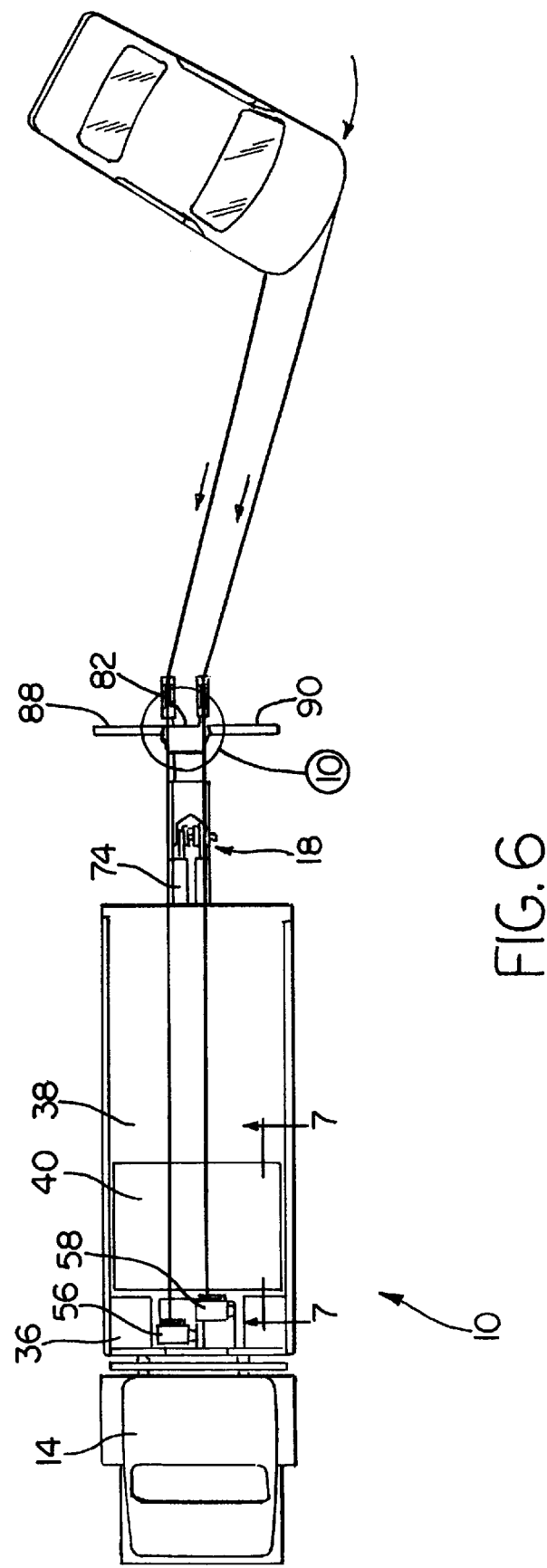
FIG. 6 is a top plan view of the present wrecker truck shown with two pulley attachments secured to the recovery boom so that a pair of cables can be used to recover a disabled vehicle.

FIG. 6 illustrates the use of cables from both of winches 56, 58 simultaneously to recovery a disabled vehicle from a ditch or ravine. The operator first removes both of the locking pins 92 and replaces them with the pulley attachments 136 in the manner described above. The removable pin 142 is pulled out or retracted pin, which permits the cable having a hook attached to be routed over pulley 137, and the pin 142 is then replaced. The use of a second cable enables the operator to pull on one portion of the vehicle with one cable and to stabilize the vehicle against rollover with a second cable. In many circumstances a high pull angle is required. Accordingly, with the rollback bed 20 in the shortened position the recovery boom 18 can be raised to the position shown in FIG. 18.

It is understood that the above description does not limit the invention to the above-given details, but may be modified within the scope of the following claims.

What is claimed:

1. In combination, a tow truck having a rollback bed with a forward portion and a rearward portion, and an improved recovery boom for retrieving transported vehicles, comprising:

said recovery boom including a base portion and an outward end, said base portion being pivotally mounted to the frame of said tow truck adjacent the end of the rearward portion of the rollback bed, said outward end of said recovery boom including an extendable portion slidable with respect to said base portion, and means for extending said extendable portion between a retracted position adjacent said base portion and an extended position extending above said rollback bed; and pivot means for pivoting said recovery boom between a generally vertical raised position extending across said end of the rollback bed and a generally horizontal position, said recovery boom extendable portion including a securement device for securement to at least a portion of one of said vehicles.

2. The combination of claim 1 and a winch having a cable, said securement device being a pulley for supporting said cable when extending from said winch over the pulley, said cable being adapted for connection to a transported vehicle.

3. The combination of claim 2 wherein said winch is carried by said roll-back bed.

4. The combination of claim 1 wherein said securement device is a pulley for guiding a cable over said recovery boom.

5. On a tow truck having a rollback bed with a forward portion and a rearward portion, an improved recovery boom for retrieving transported vehicles, comprising;

a base portion and an outward end, said base portion being pivotally mounted to the frame of the tow truck adjacent the end of the rearward portion of the rollback bed, said outward end of said recovery boom including an extendable portion slidable with respect to said base portion, and means for extending said extendable portion between a retracted position adjacent said base portion and an extended position;

pivot means for pivoting said recovery boom between a generally vertical raised position extending across said end of the rollback bed and a generally horizontal position; and including a tow bar pivotally attached to said recovery boom, said tow bar including removable locking means for securing the tow bar against movement relative to said recovery boom.

6. The combination of claim 5, wherein said locking means includes a pair of rotatable locking pins.

7. The combination of claim 6. wherein said recovery boom outward end has a pair of stop members and said locking pins include a locking flange for engaging said stop means upon rotation of said pins.

8. The combination of claim 6, wherein said rollback bed includes a winch having a cable, and further wherein at least one of said locking pins includes a pulley for guiding said cable over said recovery boom.

9. The combination of claim 5 wherein said locking means includes a pulley for guiding a cable over said recovery boom.

\* \* \* \* \*